United States Patent
Wang et al.

(10) Patent No.: US 6,289,062 B1
(45) Date of Patent: Sep. 11, 2001

(54) METHOD AND APPARATUS FOR HIGH RATE DATA COMMUNICATION UTILIZING AN ADAPTIVE ANTENNA ARRAY

(75) Inventors: Yiping Wang, Plano; Henrik Scheving, Richardson, both of TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/210,423

(22) Filed: Dec. 11, 1998

(51) Int. Cl.[7] ............................... H04L 1/04; H04B 1/10
(52) U.S. Cl. ..................... 375/346; 375/350; 375/232
(58) Field of Search ..................... 375/267, 347, 375/231, 232, 229, 350, 348, 285; 455/132, 137

(56) References Cited

U.S. PATENT DOCUMENTS

| | | | |
|---|---|---|---|
| 4,328,585 | * 5/1982 | Monsen | 375/232 |
| 4,733,402 | * 3/1988 | Monsen | 375/347 |
| 5,179,575 | * 1/1993 | Pierce et al. | 375/232 |
| 5,203,027 | * 4/1993 | Nounin et al. | 375/231 |
| 5,481,570 | * 1/1996 | Winters | 375/347 |
| 5,546,090 | 8/1996 | Riy, III et al. | 342/174 |
| 5,592,490 | 1/1997 | Barratt et al. | 370/310 |
| 5,625,880 | 4/1997 | Goldburg et al. | 455/507 |
| 5,787,118 | * 7/1998 | Ueda | 375/232 |

* cited by examiner

Primary Examiner—Tesfaldet Bocure
(74) Attorney, Agent, or Firm—Haynes and Boone, LLP (57) ABSTRACT

In a wideband Personal Communication Services system, a method and system are proposed for suppressing co-channel interference and reducing inter-symbol interference generated during the transfer of a data packet through a selected radio frequency channel. The system includes a weight controller utilizing recursive least squares algorithm to generate a plurality of appropriate weights to be integrated into received signals in order to maximize signal-to-noise ratio. A detected signal or a training sequence is intelligently switched in as a reference sequence in order to generate a plurality of appropriate weights. To further enhance the adaptive array system and take advantage of the multi-path radio frequency communication environment, two multi-path diversity schemes are included. One embodiment includes an adaptive array system with parallel array processors and another embodiment includes a system with tapped delay line processors.

6 Claims, 6 Drawing Sheets

METHOD AND APPARATUS FOR HIGH RATE DATA COMMUNICATION UTILIZING AN ADAPTIVE ANTENNA ARRAY

BACKGROUND OF THE INVENTION

1. Field of the Invention

The present invention relates generally to high speed wireless communication systems, and more particularly, to a method and system for enhancing the quality of a wideband wireless Personal Communication Services by utilizing an adaptive antenna array system.

2. Discussion of the Related Art

Figure 1:
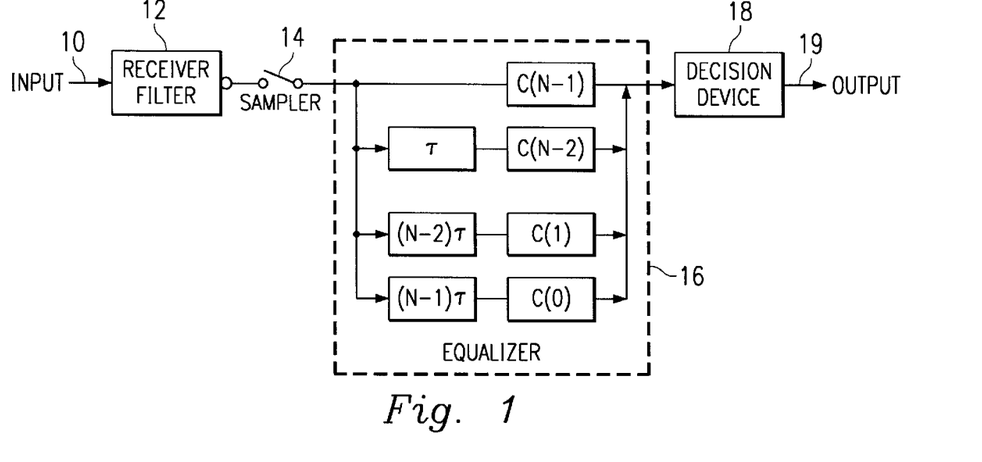
FIG. 1 illustrates a portion of a conventional PCS system integrating an equalizer therein.

The following background is described in connection with a Time Division Multiple Access (TDMA) technology and a wideband Personal Communication Services (PCS) system, as an example. Heretofore, in this field, speedy data transfer forms the cornerstone of modern wireless communication services. Faster communication connections always result in improved system capacity and service quality. Currently, the Global System for Mobile Communication (GSM) based PCS systems operate at 1900 MHz, and support only up to a rate of 9.6 Kbps for data transfer. Higher rate wideband applications are constantly being sought after to meet the ever growing demand of wireless communication services. Accordingly, High Speed Circuit Switched Data (HSCSD) and General Packet Radio Services (GPRS) are being standardized to accommodate this grave need. It is foreseeable that a wideband PCS system, such as one with a 1.6 MHz carrier bandwidth will eventually replace the lower speed system such as the GSM based PCS 1900 system. With a higher speed data service such as a wideband PCS system, however, frequency selective fading is a serious technical hurdle to be overcome. Moreover, since the high rate data transfer requires more information being transmitted through a multi-path radio propagation system, Inter-symbol Interference (ISI) also becomes another major drawback. A current solution for reducing the effect of ISI in a PCS 1900 system is to integrate an equalizer into a receiving system. FIG. 1 illustrates a portion of a typical PCS communication system with the integration of an equalizer. In this part of the PCS communication system, an input signal 10 goes through a receiver filter 12, and is then picked up by a sampler 14 and processed by an equalizer 16. Thereafter, a decision device 18 produces a final output 19. However, this type of communication system using an equalizer will not be feasible in a wideband PCS system due to a unacceptably large path delay difference. In other words, the time delay from the time a first signal will arrive at a receiving device and the time a last signal will arrive through a different path is intolerably big in comparison to the bit duration of a signal. For instance, a typical bit duration in an high rate communication system is on the order of a micro second or tenth of micro second, while a path delay could be on the order of up to 5 micro seconds. Furthermore, Co-channel Interference (CCI) is another technical obstacle for a wideband PCS. In a cellular system, frequencies are reused to increase the capacity, i.e., a frequency band is used in two different cells belonging to different clusters, sufficiently separated so that they don't interfere significantly with each other. In reality, signals using the same radio frequency channel may still unexpectedly infringe upon and weaken each other.

In a TDMA system for wireless services, a single frequency channel is divided into a number of time slots, with each communication signal using one of these slots. With TDMA, an audio signal is digitized, that is, divided into a number of digital packets, each on the order of milliseconds in length. These packets will occupy different time slots. Thus, a TDMA system allows a number of users to share a single radio frequency channel by uniquely allocating the time slots in the channel for each user. For instance, a number of cellular phone users can carry on their conversations simultaneously using the same radio frequency channel to transfer digital packets. This is in contrast to having one user occupy the entire channel for a conversation, to the exclusion of all others. By dividing the radio frequency channel into time slots, a TDMA system increases the capacity of cellular frequencies, but the problem of CCI and ISI become more acute.

Figure 2:
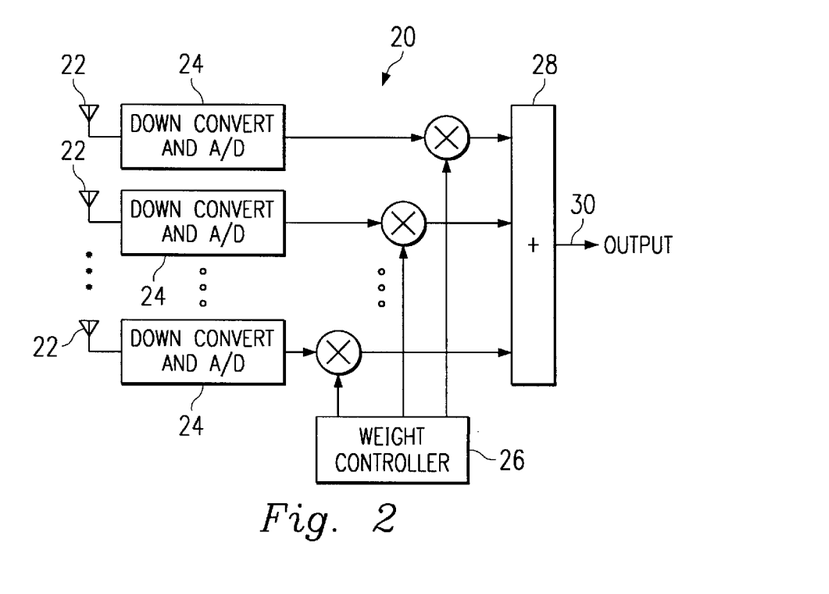
FIG. 2 shows a general overview of an adaptive array system for receiving and processing transmitted signals.

Referring now to FIG. 2, a general overview of an adaptive array system 20 for receiving and processing transmitted signals is shown. The adaptive array system 20 typically consists of a plurality of receiving devices 22 such as antennas to detect transmitted signals. A plurality of signal converting devices 24 provide for down converting or demodulating the received signals, and furnishing analog-to-digital conversion. A weight controller 26 is provided for generating a plurality of weights to be integrated into the received signals. Lastly, a combiner 28 is provided for constructing a final output signal 30. Adaptive antenna arrays have been studied in connection with mobile wireless networks to suppress both CCI and ISI. A plurality of weights are generated and integrated into the received signals by minimizing a certain criterion to maximize the signal-to-noise ratio (SNR). Conventionally, a least-mean-square algorithm has been used to update the weights of adaptive arrays, but its slow convergence presents a tracking problem. This could be even more of a problem in a high speed system such as a wideband PCS system. An alternative method such as a direct matrix inversion algorithm has been proposed just for its fast convergence feature. The direct matrix inversion algorithm is not commercially feasible, however, because of its computational complexity. Another algorithm known as constant modulus adaptive algorithm has been considered also. However, the algorithm is problematic in that a PCS system using this algorithm will capture excessive interfering signals.

It would thus be desirable to provide a method and apparatus to combat both CCI and ISI in a wideband TDMA PCS or other similar system.

SUMMARY OF THE INVENTION

With the demand for higher rate data communication systems, a wideband Personal Communication Services system is forthcoming. A method and system of the present disclosure advantageously provide means for suppressing co-channel interference and reducing inter-symbol interference generated during the transfer of a data packet through a selected radio frequency channel. Such a high rate data communication system can include a TDMA or other wireless communication system. The embodiments of the present disclosure propose the use of an adaptive array system with the integration of a weight controller utilizing recursive least squares algorithm to generate a plurality of appropriate weights to be integrated into the received signals in order to maximize signal-to-noise ratio. The system further includes a combiner for constructively combining the weighted signals, a detector for producing a binary output, an error processor for minimizing unnecessary errors generated in the system after the signals are received, and a switching means for providing a training sequence or the binary output to the error processor. A detected signal or a training sequence is intelligently switched in as a reference sequence in order to generate a plurality of appropriate weights.

In accordance with one embodiment, to further enhance such an adaptive array system and to take advantage of the multi-path radio frequency communication environment, two multi-path diversity schemes can be integrated into the adaptive array system. A system with tapped delay line processors delays the signal propagation and correspondingly generates appropriate weights to modify the delayed signals in order to obtain an optimal SNR. An adaptive array system with parallel array processors divides the signal received from each antenna element and regroups the divided signals along with different weights in order to extract and identify signals traveled through different paths. Computer simulation graphs demonstrate the significant improvement of using the proposed systems over an one-element antenna system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, wherein like reference numerals are used to refer to like elements, in which.

DESCRIPTION OF A PREFERRED EMBODIMENT

Figure 3:
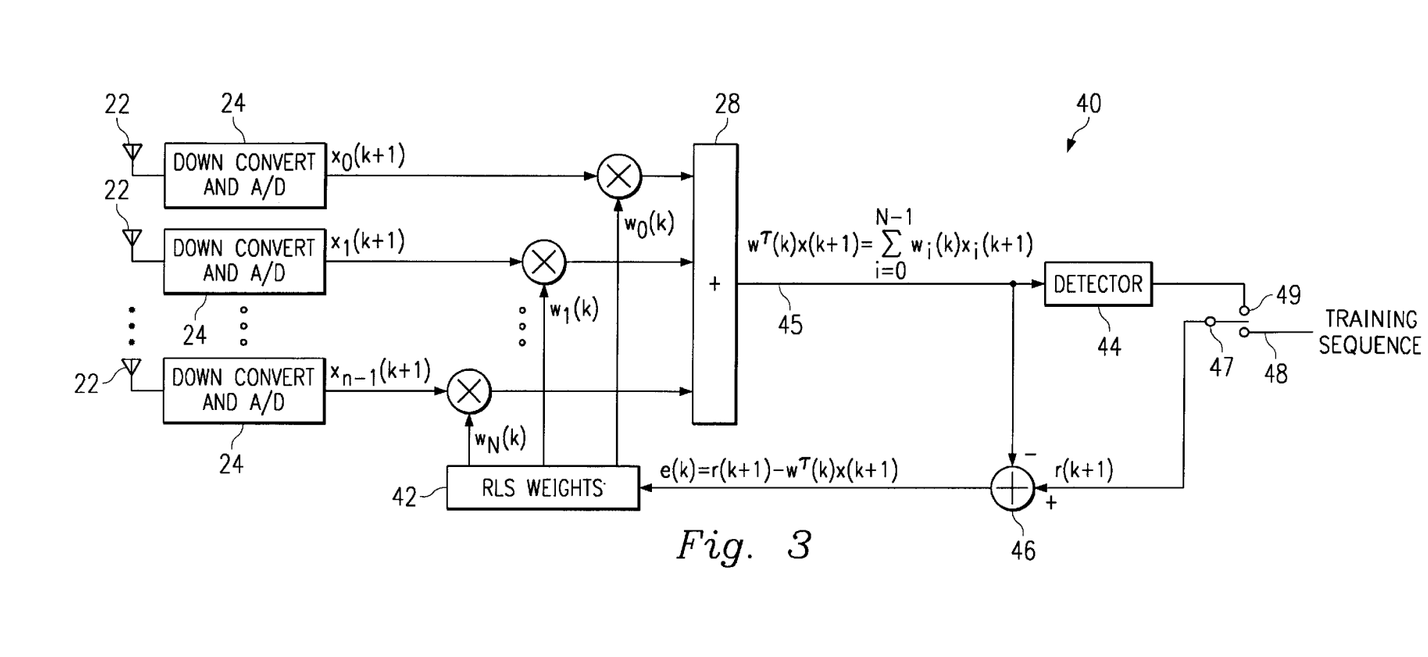
FIG. 3 illustrates an integrated adaptive array system utilizing a recursive least squares algorithm according to one embodiment of the present disclosure.

Turning now to FIG. 3, an integrated adaptive array system 40 utilizing a recursive least squares algorithm for high rate data communication system shall be discussed. The integrated adaptive array system 40 includes a plurality of receiving devices 22, a plurality of signal converting devices 24, a weight controller 42 utilizing a recursive least squares algorithm for generating a plurality of weights to be integrated into the received signals, a combiner 28 for constructively combining the weighted signals, a detector 44 for producing a binary output, an error processor 46 for minimizing unnecessary errors generated in the system after the signals are received, and a switching means 47 for providing a training sequence 48 or the binary output 49 of the detector 47 to the error processor 46. For illustration purpose, a GSM wideband TDMA communication system with a channel bit rate of 2.6 Mb/s is used. An adaptive array system using a recursive least squares algorithm is proposed for the TDMA communication system because the quick convergence feature of the recursive least squares algorithm makes it possible to track moving users (e.g., a person using a mobile phone while driving an auto). One drawback of using such an algorithm is that a reference signal must be provided during a training period to adjust the weights in order to maximize the SNR. Ideally, such a reference signal is a prescribed or known signal.

Figure 4:
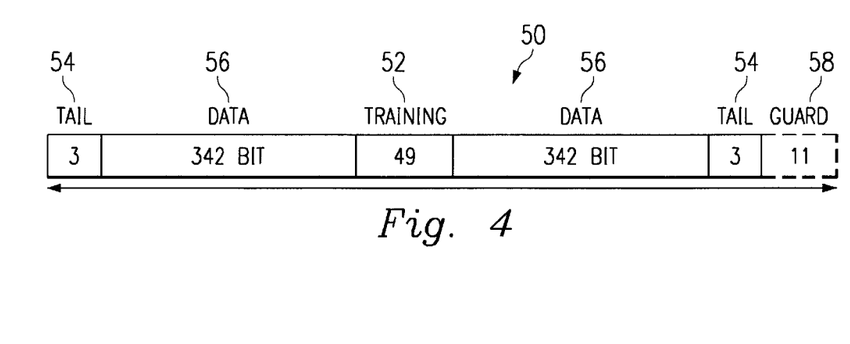
FIG. 4 illustrates a wideband TDMA burst structure.

Referring now to FIG. 4, a burst structure 50 of a wideband TDMA communication system is shown. Burst structure 50 includes a training segment 52 having a length of 49 bits of predetermined data that can be used as a reference signal. In addition to the training segment 52, structure 50 also includes two tail segments 54, two data segment 56, and an optional guard segment 58. Accordingly, a communication system can use the training segment to generate a plurality of weights during a training period, and thereafter apply the prescribed weights to an entire or whole burst. However, if an interfering signal is present only at the beginning or end of a burst, but not during the transmission of the training sequence, then the unwanted interfering signal will not be detected, nor suppressed, during the weight generation process. To overcome this obstacle, the present embodiments make use of the binary output from the detector 44 as a reference sequence for the whole burst, except for during the training period.

Referring once again to FIG. 3, a switching means 47 is installed for intelligently switching from the detected binary output to a predetermined training sequence in a prescribed manner from time to time. Once the weights are generated by the weight controller, combiner 28 will constructively combine all the weighted signals from each different antenna element 22, and produce an intermediary digital output signal 45. The relationship between the incoming signals to the combiner 28 and resulting output signal 45 can be described by the following mathematical equation:

$$Output = W^T(k)X(k+1) = \sum_{i=0}^{N-1} W_i(k)X_i(k+1)$$

wherein $W_i$ denotes the adapted weight and $Y_i(k+1)$ denotes the next incoming signal from the signal converting devices 24. Once the intermediary digital output signal 45 is produced by the combiner 28, detector 44 is used for producing a binary output 49. Since various levels of quantization can be used for a digital signal, detector 44 is needed to obtain a clearly defined binary output with uniform quantization level based on the output information from the combiner 28. The detector 44 includes channel decoding and demodulation functions which are well known in the art.

Moreover, in order to minimize errors for future iterations, the adaptive array system 40 can implement an error processor 46. The error processor is used to compare the intermediary digital output signal 45 of the combiner 28 with the switch-in reference sequence, be it the detected binary output 49 of the detector or the predetermined training sequence 48. The system 40 will acquire an error signal e(k) from the difference between these two sources of signals. The error signal is thus defined as:

$$e(k)=r(k+1)-W^T(k)X(k+1)$$

wherein r(k+1) is the switch-in reference sequence and $W^T(k)X(k+1)$ is the intermediary digital output signal 45 from the combiner 28. The error processor 48 feeds the weight controller 42 with the error signal for each iteration for the benefit of obtaining a better (i.e., improved) set of weights.

Figure 5:
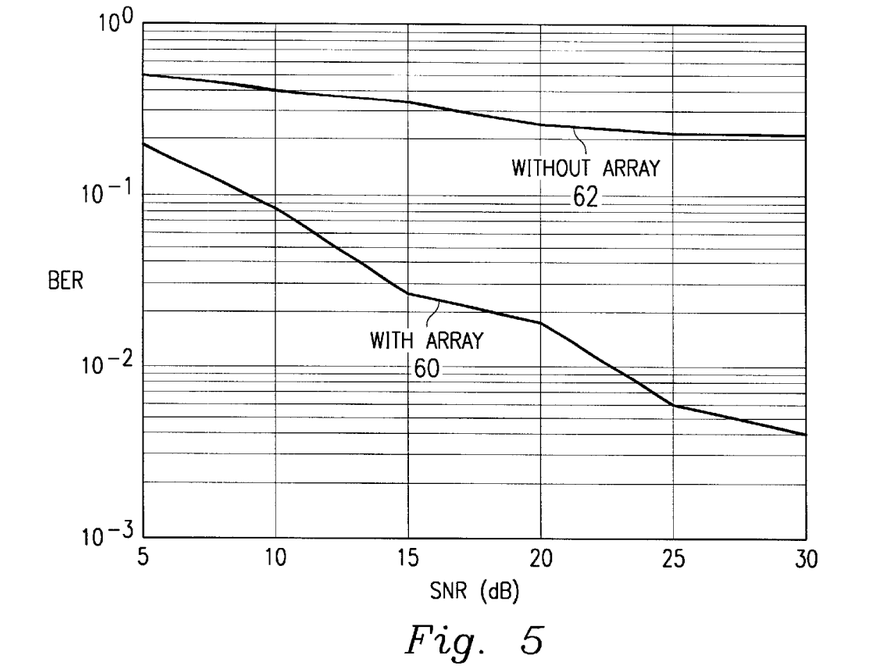
FIG. 5 is a simulation graph presenting the performance advantage of an adaptive array system.

Now turning to FIG. 5, a simulation graph presenting the performance advantage of the adaptive array system 40 is shown. This simulation graph is based on a wideband TDMA system in an urban mobile radio environment at a center frequency of 1.9 GHz, corresponding to the North American PCS band. The propagation channel is based on a six-tap TUx model. A three-sector base station with frequency reuse of 1X3 is also assumed. What this means is that the center frequency is reused at each base station but three sectors at a base station use different frequencies. As a result, the CCI problem is of consideration for this simulation. In this case, it is assumed that there are two co-channel interfering signals in addition to the desired signal. Since the power of all signals arriving at the base station is dependent upon the path loss and the shadowing, it is further assumed that a co-channel interfering signal has half the received power as the desired signal at the base station. For each signal, the QPSK modulation with a symbol length of 0.769 $\mu$s is used and thus the channel bit rate is 2.6 Mb/s. The training sequence is chosen from a set of prescribed sequences (i.e., Gold sequences) so that the selected training sequence has a very low cross-correlation with neighboring base stations. The data is then determined by a uniform distributed random variable and thermal noise is generated by a Gaussian random variable. The detector in the system includes a coherent decoder with perfect synchronization and carrier recovery. A four-element uniform linear array with spacing of the half wavelength is assumed at the base stations, and an omnidirectional adaptive array antenna system is assumed at the receiving system. FIG. 5 shows the Bit Error Rate (BER) vs. Signal-to-Noise Ratio (SNR) performance for both a four-element adaptive array system as indicated by reference numeral 60 and an one-element omnidirectional antenna system as indicated by reference numeral 62. As shown, the adaptive array system has advantageously improved the Bit Error Ratio under the same condition. The performance of the one-element antenna system is comparatively poor for two major reasons. One, in the simulation, no equalization is included, and two, the frequency is reused at each base station.

With a most simple form of an adaptive array system installed, a signal is transmitted through multiple travel paths, and every copy of the signal arrives at the base station with a certain time delay. Signals having significant delays will be canceled, which deteriorate the performance of the adaptive array system by ignoring a prescribed number of multi-path components. In order to fully utilize all the multi-path components of the system, a multi-path diversity scheme can be implemented for further enhancing the quality of the system. One option is to use tapped delay line processors, which enable the adaptive array system to exploit different delay paths in different directions. This integration of tapped delay line processors with the adaptive array system can further suppress wideband interferences.

Figure 6:
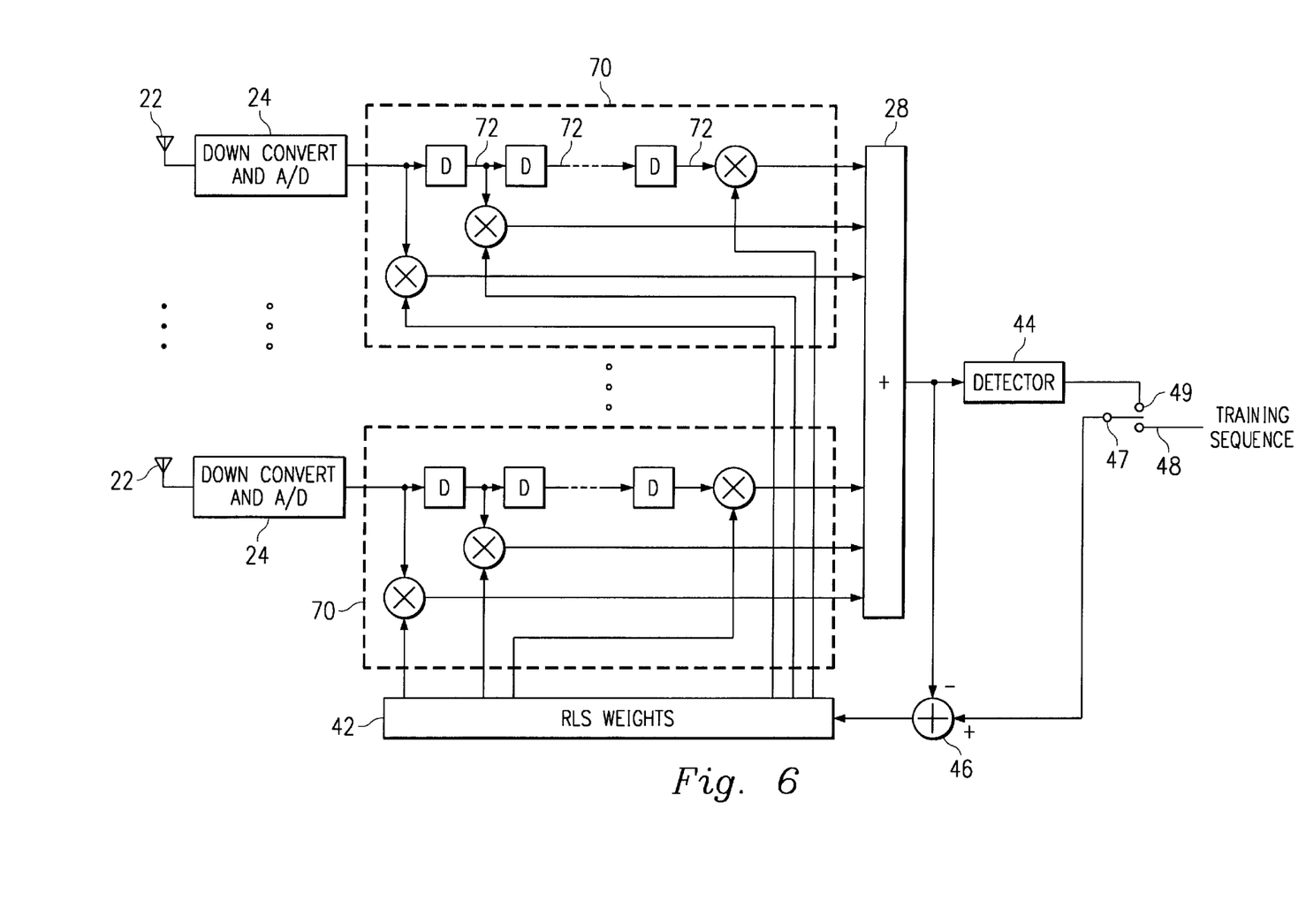
FIG. 6 illustrates an advanced adaptive array system with multi-path diversity utilizing a plurality of tapped delay line filters according to another embodiment of the present disclosure.
Figure 7:
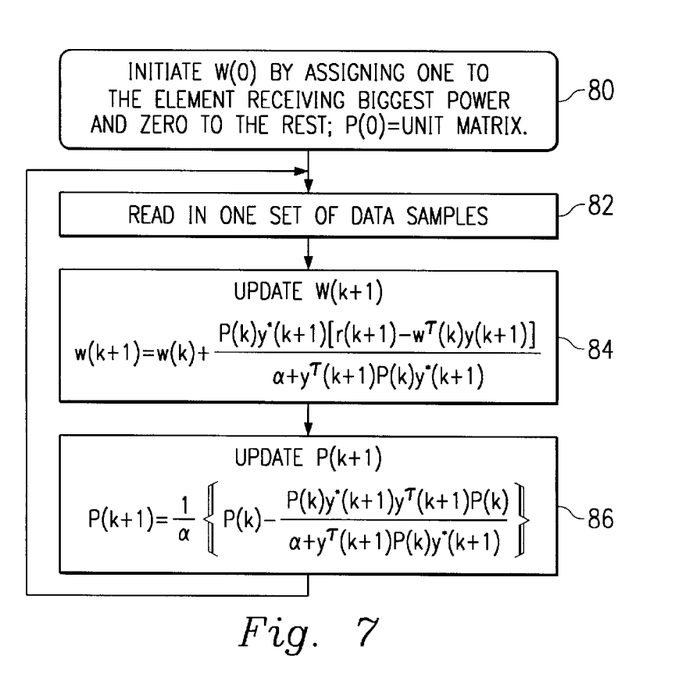
FIG. 7 presents a flow diagram of the recursive least square algorithm used in connection with the embodiments of the present disclosure.

Referring now to FIG. 6, in conjunction with FIG. 7, an adaptive array system with the integration of a plurality of tapped delay line processors 70 and a recursive least squares weight controller 42 shall be discussed. With an L tapped delay line processor, for example, received signals are broken into signal elements 72 by the imposed delays. The delay interval of each tap T of the delay line processor is given by the formula:

$$T = \frac{r}{4f_c}$$

wherein $f_c$ is the carrier frequency and r is selected to occur in the range of $$\frac{1}{B} < r < \frac{4}{B}$$

where $B=\Delta f/f_c$, with $\Delta f$ being the real bandwidth. Assume $X_l$ is the vector of element signals from the lth tap, the weights of a tapped delay line processor is a length of N*L vector, N being the number of the array elements, and the recursive least squares iteration relations are accordingly as follows:

$$W(k+1) = W(k) + \frac{P(k)Y^*(k+1)[r(k+1) - W^T(k)Y(k+1)]}{\alpha + Y^T(k+1)P(k)Y^*(k+1)}$$

wherein $$P(k+1) = \frac{1}{\alpha}\left\{P(k) - \frac{P(k)Y^*(k+1)Y^T(k+1)P(k)}{\alpha + Y^T(k+1)P(k)Y^*(k+1)}\right\}$$

and $$Y^T(k)=[X_0(k),X_1(k) \ldots X_{L-1}(k)]$$

wherein $\alpha$ is a forgetting factor and r(k) is a reference signal.

As shown in FIG. 7, step 80, the weight controller initiates the first set of weights W(0) by assigning one (1) to the element signal having the strongest power, and zero (0) to the rest of the element signals, and further setting P(0) as a unit matrix. In step 82, a whole set of data samples are read in by the weight controller fed by the error processor. In step 84, a new set of weights, W(k+1), is updated based upon the fed-in data sample of step 82. P(k+1) is subsequently updated in step 86. Accordingly, the recursive least squares weight controller 42 provides the tapped delay line processors 70 a plurality of weights to integrate them into incoming multi-path signals.

Figure 8:
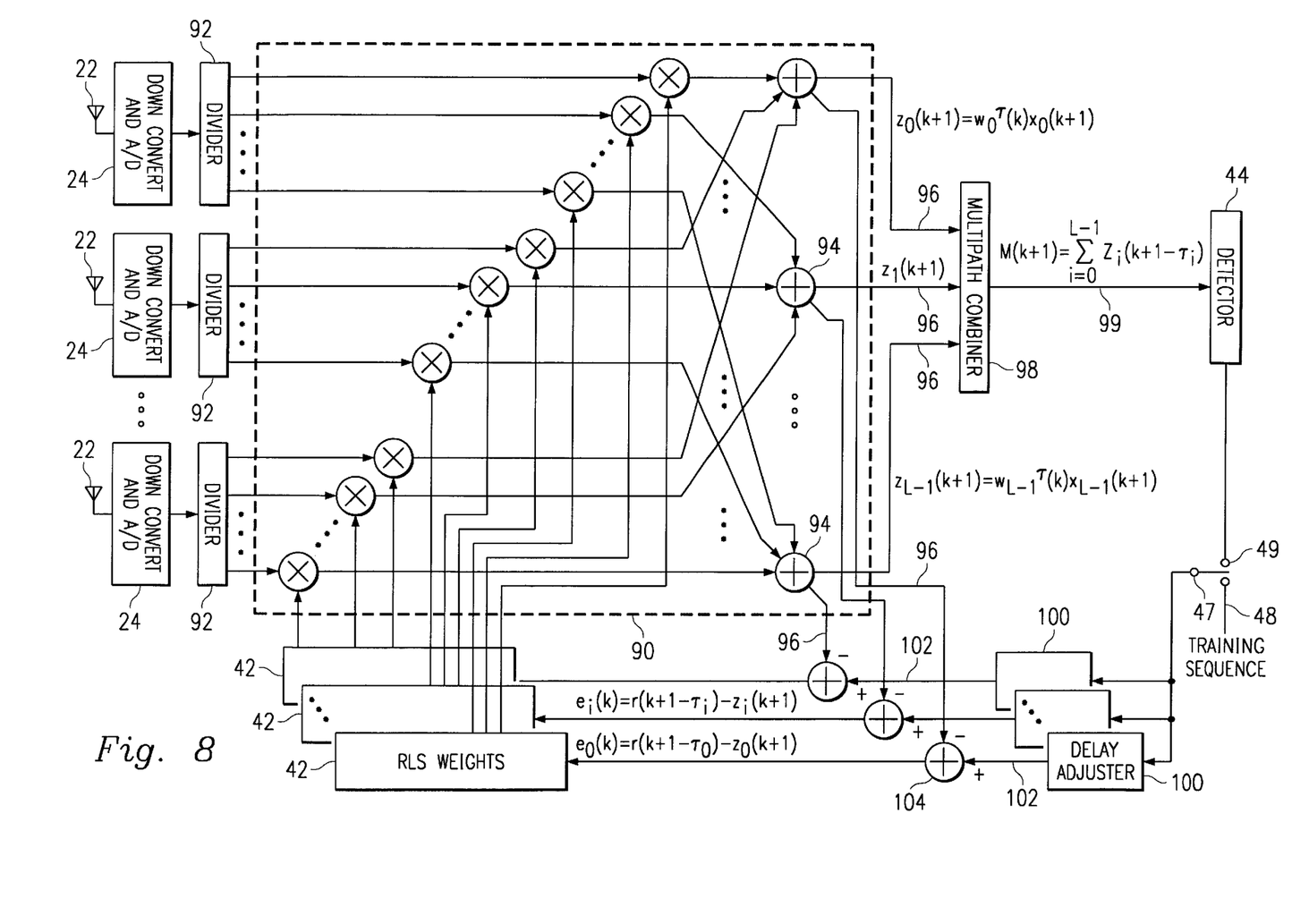
FIG. 8 illustrates an advanced adaptive array system with multi-path diversity utilizing a plurality of L parallel array processors according to another embodiment of the present disclosure.

With reference now to FIG. 8, another embodiment of the present disclosure uses an L parallel array processor 90 (instead of the tapped delay line processors) for the multi-path diversity purpose. L denotes the number of parallel array processors used. After the analog signals have been received by respective antenna, down converted, quantized, and converted to digital signals, a plurality of dividers 92 further divides each signal from a respective antenna element into a finite number of signals containing the same data information but with less power. Each branch 94 of the L parallel array processors 90 will obtain one copy of the signal from each divider and integrate a particular set of weights into them for extracting one multi-path component or a branch signal 96 of the desired signal, further by nullifying out other multi-path components. Accordingly, the multi-path component recognized by each branch, $Z_i(k+1)$, is defined as:

$$Z_i(k+1)=W_i^T(k)X_i(k+1)$$

Consequentially, each branch constructively generates a branch signal 96 with respect to different paths that the signals have traveled. Once the L parallel array processor 90 identifies the branch signals 96 with respect to various paths, a multi-path combiner 98 is used to finalize a constructed signal 99. The multi-path combiner 98 basically modifies the branch signals 96 with a time delay and sums them up. The delay profile of branch signals 96 can be estimated by using a synchronization block of a conventional wideband TDMA system. Depending on different situations, an equal gain combining scheme, a maximal ratio combining scheme, or other similar type of combining scheme, as known in the art, can be applied in the multi-path combiner 98.

With reference still to FIG. 8, in order to provide a reference sequence with appropriate time delays, a plurality of delay adjusters 100 are installed to modify the timing profile of the switched-in sequence, whether it be the training sequence 48 or the detected signal 49. A reference signal 102 after adjustment is denoted as $r(k+1-\tau_i)$ with $\tau_i$ symbolizing an adjustment. Moreover, the reference signal 102 is fed into a plurality of error processor 104 in order to minimize errors introduced by the multi-path ISI and CCI. Further, due to the nature of the mechanism of applying parallel array processors, the various multi-path components require a plurality of weight controllers 42 in conjunction with the delay adjusters 100 and the error processors 104 to provide each multi-path component a unique set of reference signal, error signal, and recursive least squares weights.

Figure 9:
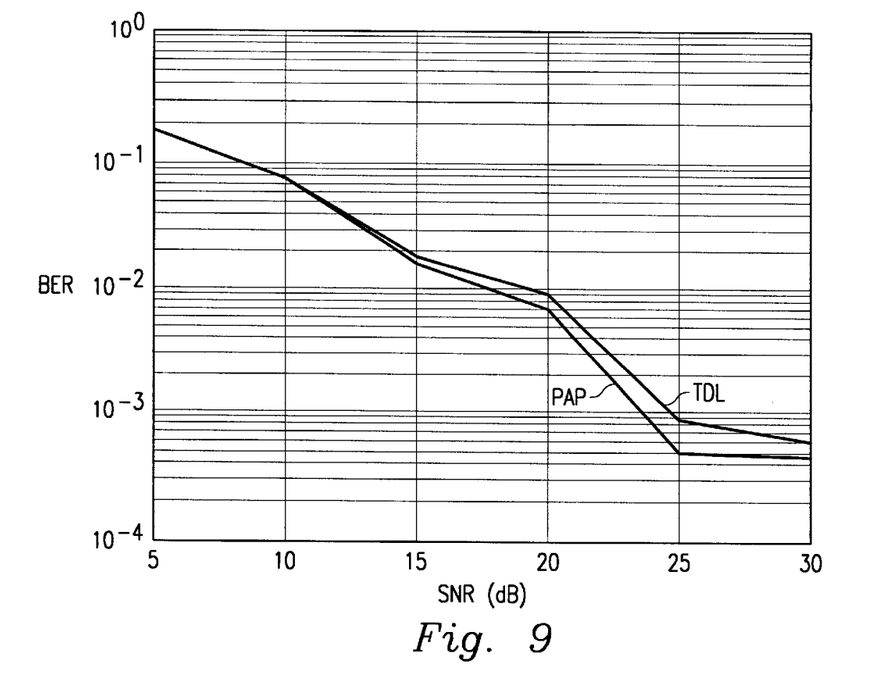
FIG. 9 shows a BER vs. SNR simulation graph presenting performance advantages of an advanced adaptive array system with multi-path diversity according to the embodiments of the present disclosure.

Now turning to FIG. 9, a simulation graph presenting performance advantages of an advanced adaptive array system with multi-path diversity according to the embodiments of the present disclosure shall now be discussed. In this case, three parallel array processors, in conjunction with a maximal ratio combiner, were used to extract three strongest multi-path components. For an adaptive array system with tapped delay line processors, three tapped delay line processors on each antenna element is correspondingly applied. The tap spacing is 0.263 μs, which corresponds to r=2000. FIG. 9 compares the performance of BER vs. SNR between a system with tapped delay line processors (TDL system) and one with parallel array processors (PAP system) for an AOA of 50°. The AOA is defined as the maximal angle of arrival difference among the delayed signals through different paths. At $BER=10^{-3}$, the PAP system has outperformed the TDL system by more than 1 dB.

Figure 10:
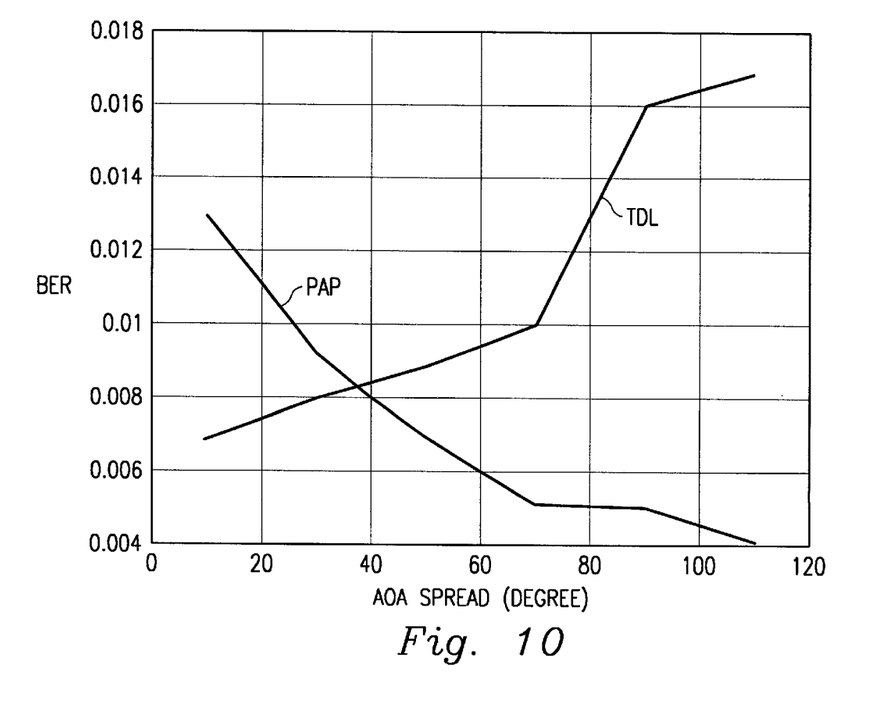
FIG. 10 shows a BER vs. AOA spread simulation graph presenting performance advantages of an advanced adaptive array system with multi-path diversity according to the embodiments of the present disclosure.

Further turning to FIG. 10, another simulation graph presenting performance advantages of an advanced adaptive array system with multi-path diversity according to the embodiments of the present disclosure is shown. The performance comparison between a PAP system and a TDL system at a SNR of 20 dB for different values of AOA spread is given. As illustrated, for a wide AOA spread, the PAP system has done better than the TDL system, but vice versa for a narrow AOA spread.

While the invention has been particularly shown and described with reference to the preferred embodiments thereof, it will be understood by those skilled in the art that various changes in form and detail may be made therein without departing from the spirit and scope of the invention, as set forth in the following claims.

What is claimed is:

1. For wideband Personal Communication Services, a system for suppressing co-channel interference and reducing inter-symbol interference generated during the transfer of a data packet through a selected radio frequency channel, said system comprising:
    an array of telecommunication hardware elements for receiving and formatting a plurality of copies of the data packet having various time and amplitude distortions in the waveforms thereof, the formatted copies providing one or more input signals for further processing;
    means for integrating a plurality of recursive least square weights into the input signals, wherein the means for integrating a plurality of recursive least square weights further comprises:
        a weight controller for generating a plurality of least square weights;
        a plurality of dividers for generating additional copies of the input signals with less signal power;
        a plurality of L parallel array processors for integrating the least square weights to the input signals in conjunction with the weight controller and the dividers to produce a plurality of processed signals;
        a plurality of adjusters for adjusting a time delay of the detected data packet to produce a plurality of adjusted signals with different time delays;
        a plurality of error processors for comparing the adjusted signals from the adjusters to the processed signals from the L parallel array processors in order to generate a plurality of optimal least square weights in the weight controller;
    means for constructing an output signal from the weighted input signals;
    a detector for detecting the output signal; and
    means for intelligently switching between a reference data sequence and the detected output signal in order to assist the means for integrating a plurality of recursive least square weights into the input signals to obtain the optimal recursive least square weights.

2. In a wideband Personal Communication Services system, a system for suppressing co-channel interference and reducing inter-symbol interference generated during the transfer of a data packet through a selected radio frequency channel, said system comprising:
    an array of antennas for receiving a plurality of copies of the data packet having various time and amplitude distortions in the waveforms thereof;
    a plurality of down converters and analog-to-digital converters for formatting the copies of the data packet into a plurality of digital input signals;
    a plurality of dividers for generating additional copies of the input signals with less signal power;
    a weight controller for generating a plurality of least square weights;
    a plurality of L parallel array processors for integrating the generated least square weights to the copies of the input signals with less signal power to form a plurality of processed signals;
    a multi-path combiner for constructing an output signal from the processed signals;
    a detector for detecting the output signal;
    a switching means for intelligently switching between a reference data sequence and the detected output signal to produce a switched signal;
    a plurality of adjusters for adjusting time delay of the switched signal to produce a plurality of adjusted signals with different time delays; and
    a plurality of error processors for comparing adjusted signals to the processed signals from the L parallel array processors in order to generate a plurality of optimal least square weights.

3. A method for suppressing co-channel interference and reducing inter-symbol interference generated during the transfer of a data packet through a selected radio frequency channel in a wideband Personal Communication Services system, said method comprising the steps of:

receiving and formatting a plurality of copies of the data packet having various time and amplitude distortions in the waveforms thereof; and receiving sequentially every bit of the formatted copies to form a plurality of input signals;

generating a plurality of least square weights by a weight controller;

generating additional copies of the input signals with less signal power with the use of a plurality of dividers;

integrating the generated least square weights into the copies of the input signals with less signal power with the use of a plurality of L parallel array processors to form a plurality of processed signals;

adjusting a time delay of the detected data packet by a plurality of adjusters to produce a plurality of adjusted signals with different time delays; and comparing the adjusted signals from the adjusters to the processed signals from the L parallel array processors in order to generate a plurality of optimal least square weights in the weight controller;

constructing an output signal from the weighted input signals with the use of a multi-path combiner;

detecting the output signal by a detector; and intelligently switching between a reference data sequence and the detected output signal using a switching means in order to generate the optimal recursive least square weights.

4. A method for suppressing co-channel interference and reducing inter-symbol interference generated during the transfer of data packet through a selected radio frequency channel in a wideband Personal Communication Services system, said method comprising the steps of:

receiving a plurality of copies of the data packet having various time and amplitude distortions in the waveforms thereof with the use of an array of antennas;

formatting the copies of the data packet into a plurality of digital input signals with the use of a plurality of down converters and analog-to-digital converters;

generating additional copies of the input signals with less signal power with the use of a plurality of dividers;

generating a plurality of least square weights with the use of a weight controller;

integrating the generated least square weights into the copies of the input signals with less power to generate a plurality of processed signals with the use of a plurality of L parallel array processors;

constructing an output signal from the processed signals with the use of a multi-path combiner;

detecting the output signal with the use of a detector;

intelligently switching between a reference data sequence and the detected output signal with the use of a switching means to produce a switched signal;

adjusting a time delay of the switched signal to produce a plurality of adjusted signals with different time delays with the use of a plurality of adjusters; and comparing adjusted signals to the processed signals from the L parallel array processors in order to generate a plurality of optimal least square weights.

5. A method for suppressing co-channel interference and reducing inter-symbol interference generated during the transfer of data packet through a selected radio frequency channel in a wideband Personal Communication Services system, said method comprising the steps of:

formatting a plurality of copies of a data packet into a plurality of digital input signals;

generating additional copies of the input signals with less signal power with the use of a plurality of dividers;

integrating a plurality of least square weights into the copies of the input signals with less power to generate a plurality of processed signals with the use of a plurality of L parallel array processors;

constructing an output signal from the processed signals with the use of a multi-path combiner;

intelligently switching between a reference data sequence and the output signal with the use of a switching means to produce a switched signal;

adjusting a time delay of the switched signal to produce a plurality of adjusted signals with different time delays with the use of a plurality of adjusters; and comparing the adjusted signals to the processed signals from the L parallel array processors in order to optimize the least square weights.

6. An apparatus for suppressing co-channel interference and reducing inter-symbol interference generated during the transfer of data packet through a selected radio frequency channel in a wideband Personal Communication Services system, said apparatus comprising:

a plurality of analog-to-digital converters for formatting a plurality of copies of a data packet into a plurality of digital input signals;

a plurality of dividers for generating additional copies of the input signals with less signal power;

a plurality of L parallel array processors for integrating a plurality of least square weights into the copies of the input signals with less power to generate a plurality of processed signals;

a multi-path combiner for constructing an output signal from the processed signals;

a switching means for intelligently switching between a reference data sequence and the output signal to produce a switched signal; and a plurality of adjusters for adjusting a time delay of the switched signal to produce a plurality of adjusted signals with different time delays, wherein the adjusted signals are compared to the processed signals from the L parallel array processors in order to optimize the least square weights.

* * * * *